US012549822B1

(12) United States Patent
Yin et al.

(10) Patent No.: US 12,549,822 B1
(45) Date of Patent: Feb. 10, 2026

(54) ADAPTIVE SUBTITLE COLOR MANAGEMENT ENGINE

(71) Applicant: eBay Inc., San Jose, CA (US)

(72) Inventors: Weiting Yin, JiangYin (CN); Stone Huang, Shanghai (CN); Feng Xie, ShangHai (CN); Kun Yu, Shanghai (CN); Xiwei Huang, Shanghai (CN); Jian Pan, Shanghai (CN); Damin He, Shanghai (CN)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 18/949,184

(22) Filed: Nov. 15, 2024

(51) Int. Cl.
*H04N 21/488* (2011.01)
*H04N 21/234* (2011.01)
*H04N 21/485* (2011.01)
*H04N 21/81* (2011.01)

(52) U.S. Cl.
CPC ... *H04N 21/4884* (2013.01); *H04N 21/23418* (2013.01); *H04N 21/485* (2013.01); *H04N 21/8146* (2013.01)

(58) Field of Classification Search
CPC ......... H04N 21/23418; H04N 21/4884; H04N 21/485; H04N 21/8146
See application file for complete search history.

(56) References Cited

U.S. PATENT DOCUMENTS

| | | | | |
|---|---|---|---|---|
| 4,750,053 A * | 6/1988 | Allen | ..................... | H04H 60/56 386/253 |
| 6,914,637 B1 * | 7/2005 | Wolf | ..................... | H04N 19/89 348/476 |
| 7,131,004 B1 * | 10/2006 | Lyle | ..................... | H04L 9/12 713/169 |
| 7,179,980 B2 * | 2/2007 | Kirkeby | ................. | H04H 60/37 |
| 7,242,766 B1 * | 7/2007 | Lyle | ..................... | H04L 9/3271 380/2 |
| 7,499,462 B2 * | 3/2009 | MacMullan | ..... | H04N 21/43615 348/E5.103 |
| 8,479,236 B2 * | 7/2013 | Tao | ..................... | H04N 21/4363 725/80 |

(Continued)

FOREIGN PATENT DOCUMENTS

CN 102547147 A 7/2012

*Primary Examiner* — Michael B. Pierorazio
(74) *Attorney, Agent, or Firm* — Shook, Hardy & Bacon L.L.P.

(57) ABSTRACT

Methods, systems, and computer storage media for providing an adaptive subtitle color management engine in an item listing system. The adaptive subtitle color management engine supports automatically updating a subtitle color of a video to a new subtitle color (e.g., contrast color) that is legible against the changing colors and brightness of levels of video-background. Subtitle data associated with video data can include a subtitle segment time stamp including a subtitle start time and a subtitle end time. Based on the subtitle file data and the subtitle segment time stamp, frames of video are identified for computing a contrast color for subtitles for the frames. The evaluation to change the subtitle color is repeated for frames associated with subtitles as defined in the subtitle file data. The contrast color is determined based on the average background color of the frame, where the average background color indicates an average pixel intensity.

20 Claims, 9 Drawing Sheets

(56) References Cited

U.S. PATENT DOCUMENTS

| | | | |
|---|---|---|---|
| 8,744,230 B2 * | 6/2014 | Hovagim | H04N 21/8541 |
| | | | 386/200 |
| 8,872,969 B1 | 10/2014 | Rathi et al. | |
| 11,295,497 B2 | 4/2022 | Castellucci et al. | |
| 2005/0066356 A1 * | 3/2005 | Stone | H04N 21/4408 |
| | | | 380/255 |
| 2006/0031889 A1 * | 2/2006 | Bennett | H04N 21/6118 |
| | | | 348/E7.071 |
| 2007/0237332 A1 * | 10/2007 | Lyle | H04L 63/0464 |
| | | | 380/263 |
| 2007/0274348 A1 * | 11/2007 | Friedman | H04J 3/0697 |
| | | | 370/503 |
| 2008/0180518 A1 * | 7/2008 | Miyazaki | H04N 21/4405 |
| | | | 375/E7.025 |
| 2008/0307496 A1 * | 12/2008 | Kurose | H04N 21/4367 |
| | | | 726/2 |
| 2009/0040287 A1 * | 2/2009 | Miyazaki | H04N 21/4367 |
| | | | 348/14.01 |
| 2010/0037253 A1 * | 2/2010 | Sheehan | H04N 21/2668 |
| | | | 725/35 |
| 2010/0299264 A1 * | 11/2010 | Berger | G06Q 30/0601 |
| | | | 705/59 |
| 2010/0322417 A1 * | 12/2010 | Altmann | H04N 21/4122 |
| | | | 380/42 |
| 2018/0270512 A1 | 9/2018 | Tsukagoshi | |
| 2019/0306576 A1 * | 10/2019 | Shimizu | G09G 5/14 |

* cited by examiner

ADAPTIVE SUBTITLE COLOR MANAGEMENT ENGINE

BACKGROUND

Users can interact with item listing systems that support storing items in item databases and providing a search system for receiving queries and identifying search result items based on the queries. An item listing platform may also be designed to support video content—for example, for items listed for sale and for other types of features of the item listing system—to enhance user experience and accessibility. For example, the item listing system may elevate the online shopping experience by incorporating video content into item listings. Each item for sale can feature videos that showcase its usage, highlight key features, and provide a comprehensive view from multiple angles. This visual approach allows customers to engage with products in a way that static images alone cannot achieve. The item listing system can support video content with subtitles or closed captions for accessibility, enhanced comprehension, and multilingual support. In this way, the item listing system can leverage video to enhance item listings, making it easier for customers to understand and engage with items. By incorporating subtitles, the system ensures that all users can access and benefit from the content, promoting inclusivity and maximizing reach.

SUMMARY

Various aspects of the technology described herein are generally directed to systems, methods, and computer storage media for, among other things, providing an adaptive subtitle color management engine in an item listing system. The adaptive subtitle color management engine supports automatically updating a subtitle color of a video to a new subtitle color (e.g., contrast color) that is legible against the changing colors and brightness of levels of video-background. Subtitle data associated with video data can include a subtitle segment time stamp including a subtitle start time and a subtitle end time. Based on the subtitle file data and the subtitle segment time stamp, frames of video are identified for computing a contrast color for subtitles for the frames. The evaluation to change the subtitle color is repeated for frames associated with subtitles as defined in the subtitle file data. The contrast color is determined based on the average background color of the frame, where the average background color indicates an average pixel intensity. In one embodiment, the contrast color is set to white when the average pixel intensity is below a predefined threshold and the contrast color is to black when the average pixel intensity is above a predefined threshold.

In operation, a subtitle file comprising subtitle file data is accessed. The subtitle file is associated with video data. Using the subtitle file data, a subtitle segment associated with the subtitle file data is identified. The subtitle file data comprises a subtitle segment timestamp including a subtitle start time and subtitle end time. Based on the subtitle file data and subtitle segment timestamp, a frame from the video data is identified. The frame is associated with a subtitle having a subtitle color. An average background color is computed based on executing a color averaging operation for at least a subtitle display portion of the frame. A contrast color associated with the average background color is computed. The subtitle color in the subtitle file is automatically updated to the contrast color.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The technology described herein is described in detail below with reference to the attached drawing figures, wherein.

DETAILED DESCRIPTION OF THE INVENTION

Overview

Figure 1A:
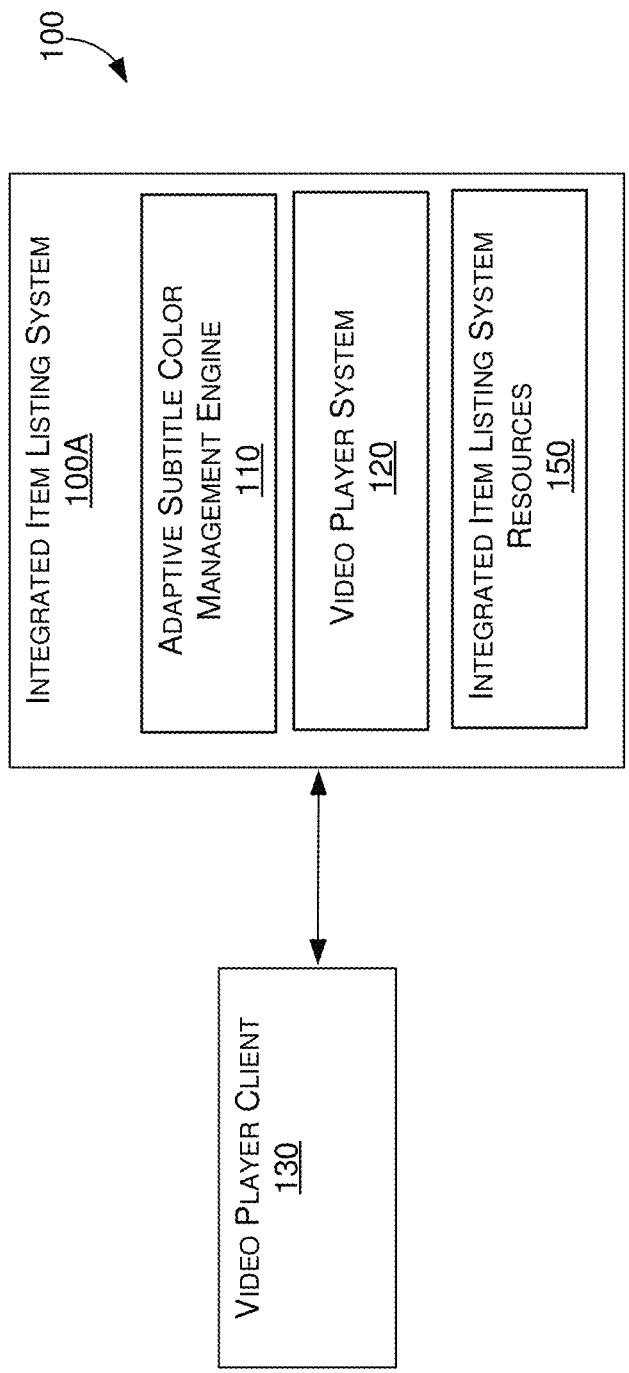
FIG. 1A is block diagram of a video player system for providing adaptive subtitle color management in an item listing system, in accordance with aspects of the technology described herein.

An item listing system and platform support storing items (products or assets) in item databases and providing a search system for receiving queries and identifying search result items based on the queries. An item (e.g., physical item or digital item) refers to a product or asset that is provided for listing on an item listing platform. Search systems support identifying, for received queries, result items from item databases. Item databases can specifically be for content platform or item listing platforms such as EBAY content platform, developed by EBAY INC., of San Jose, California.

An item listing system may also provide a video player system for video content associated with functionality provided via the item listing system. A video player system is a software application that enables the playback of video files, often supporting various formats and providing features like play, pause, rewind, and fast-forward. It may also include additional functionalities such as subtitles, playlists, and interactive elements to enhance the viewing experience.

A video player system can be integrated with item listing system to allow sellers to showcase products through engaging video content, enhancing the shopping experience for customers. The video player system typically supports features like subtitles, product demonstrations, and user interaction, helping to increase engagement and conversion rates.

By integrating videos into item listing system functionality, the item listing system transforms the online shopping experience, providing potential buyers with engaging visual content that demonstrates product usage, highlights essential features, and offers multiple viewpoints. This multimedia approach significantly enriches user engagement compared to traditional static images, allowing customers to better understand the products before making a purchase.

The item listing system promotes accessibility and inclusivity by offering video content with subtitles or closed captions. This functionality not only ensures that users with hearing impairments can fully engage with the material but also enhances comprehension for all users. Additionally, the multilingual subtitle support broadens the platform's reach, catering to diverse audiences and facilitating a more comprehensive understanding of the items listed. In this way, the item listing system leverages video content and subtitle functionality to create a more interactive, accessible, and user-friendly environment for online shopping. By prioritizing these features, the item listing system aims to enhance product visibility and understanding, thereby promoting inclusivity and maximizing user engagement.

Conventionally, video player systems are not configured with a comprehensive infrastructure and logic to ensure that subtitles are legible against the changing colors and brightness of levels of video-background. Subtitles are central for understanding and accessibility, yet their visibility can be compromised if they do not contrast well with the dynamic video content. The issue arises because, unlike static images where the background remains constant, video backgrounds are in constant flux as scenes transition. This variability means that a subtitle font color, which might be effective in one segment of the video, could become nearly invisible in another segment due to shifts in the background color and lighting.

Conventional video players may support manual adjustment and inverting background color techniques. The manual adjustment approach involves changing the subtitle color at various points throughout the video to maintain optimal readability as the background color changes. This method requires extensive labor and attention to detail as each segment with a different background color must be individually adjusted. For long-form content, such as movies or TV shows, this process can be time-consuming and error-prone. Furthermore, for live streams or real-time broadcasts, this solution is impractical because it cannot keep up with the rapid pace at which content is delivered, and the subtitles must be displayed instantaneously.

An alternative solution involves processing the video to invert the colors of the area behind the subtitles to enhance contrast with the subtitle text. This method aims to ensure that subtitles remain readable regardless of the background color. However, it has several drawbacks. Altering the video's background colors can distort the original content, impacting the viewer's experience by modifying the intended visual aesthetics and potentially affecting the video's artistic integrity. Additionally, the effectiveness of this approach varies depending on the video's complexity and color patterns. Scenes with intricate or rapidly changing backgrounds may still pose challenges for this method, leading to inconsistent results.

Ensuring that subtitles are legible against the changing colors and brightness levels of a video background presents a considerable challenge. The visibility of subtitles is central to viewer comprehension and satisfaction. Effective subtitle readability is particularly important for viewers with visual impairments, those who are non-native speakers, or anyone watching in less-than-ideal lighting conditions. Poor subtitle visibility can lead to frustration and reduced engagement with the content.

For creators and distributors, the challenge extends beyond mere readability. Maintaining the original visual quality and artistic intent of the video while ensuring that subtitles are legible is essential. Any solution that compromises the visual integrity of the content can detract from the viewer's overall experience and undermine the artistic vision of the creators. Thus, finding a balance between readability and content integrity is key to delivering a high-quality viewing experience. As such, a more comprehensive item listing system—with an alternative basis for performing video operations—can improve computing operations and interfaces for providing adaptive subtitle color management for video content associated with the item listing system.

Description of Technical Solution

At a high level, an adaptive subtitle color management engine is provided as a video player system feature that dynamically adjusts subtitle colors in real-time to enhance readability against varying video backgrounds. By analyzing the average brightness or color of each video frame, the adaptive subtitle color management engine selects a contrasting subtitle color (e.g., white or black) to ensure that subtitles remain visible as the video content changes. This process ensures that subtitles are consistently legible, even during scenes with rapidly shifting colors or lighting conditions.

By way of illustration, dynamic video environments, subtitle readability can be compromised when there is insufficient contrast between the text and the constantly changing background. To address this challenge, an adaptive subtitle color management system is introduced, leveraging existing subtitle file data (such as SRT or VTT) to ensure optimal visibility. Using existing subtitle file data, such as SRT or VTT, for adaptive subtitle color management offers key advantages. Precise timestamps in these files allow real-time subtitle color adjustments, while contextual information, including text and metadata, and helps ensure colors are suited to the scene's dynamics. This method efficiently utilizes existing structures, eliminating the need for additional data files. The adaptive subtitle color management engine operates by accessing the subtitle file, identifying corresponding video frames where subtitles appear, and analyzing the background color in the subtitle display portion of each frame. By calculating the average pixel intensity, it determines whether to adjust the subtitle color for better contrast—switching between white and black depending on the brightness of the background. Once the appropriate contrast color is selected, the subtitle file is automatically updated, ensuring that the text remains clear and legible throughout the video. The process is repeated for each subtitle, providing an adaptive, seamless viewing experience across both pre-recorded and streamed videos. In this way, the adaptive subtitle color management system supports subtitle file and video data access, frame identification and subtitle segment matching, average background color calculation, contrast color determination, automatic subtitle color update, and handling subsequent subtitles.

Operationally, adaptive subtitle color management engine begins by accessing a subtitle file containing structured subtitle data. This file is associated with specific video data and includes information such as the subtitle segments, timestamps (i.e., start time and end time), and initial subtitle color. Both pre-recorded and streamed video data can be supported, making the solution versatile. Using the subtitle file's timestamp data, the adaptive subtitle color management engine identifies video frames that coincide with the display of each subtitle. Each frame contains a portion of the video where the subtitles are rendered. This portion, known as the subtitle display portion, will be the focus of the color analysis.

Once a subtitle display portion is identified, the adaptive subtitle color management engine executes a color averaging operation. This operation calculates the average background color by computing the pixel brightness across the subtitle display portion of the frame. The result is an average pixel intensity, which serves as the foundation for selecting a suitable contrast color for the subtitle. Based on the calculated average pixel intensity, the adaptive subtitle color management engine selects the appropriate contrast color. In one implementation: if the average pixel intensity is below a predefined threshold (i.e., the background is dark), the subtitle color is set to white; and if the average pixel intensity exceeds the threshold (i.e., the background is bright), the subtitle color is changed to black. This operation ensures that the subtitle text maintains high contrast against the background, making it easier to read.

After determining the optimal contrast color, the adaptive subtitle color management engine automatically updates the subtitle file to reflect the new subtitle color for the corresponding frame. This process is repeated for each subtitle displayed throughout the video, ensuring a seamless and adaptive viewing experience. For each subsequent subtitle in the video, the adaptive subtitle color management engine repeats the above operations. It identifies the frame associated with the next subtitle, computes the average background color of the subtitle display portion, and updates the subtitle color accordingly.

By way of example, in an original SRT file, the subtitle colors are already defined, but they do not adapt dynamically based on the video background. The colors remain static and may not be optimal for every scene:

1
00:00:01,000——>00:00:05,000
<font color="#00FF00">Welcome to our product showcase.</font>
00:00:05,500——>00:00:10,000
2
<font color="#00FF00">This device has multiple features.</font>
3
00:00:10,500——22 00:00:15,000
<font color="#00FF00">Let's see how it works.</font>

In this case, all subtitles are set to green (#00FF00), which may not provide good contrast against every background in the video, potentially leading to readability issues.

With adaptive subtitle color management, the adaptive subtitle color management engine dynamically adjusts the subtitle colors to provide optimal contrast based on the video background's average brightness and color. The updated SRT file reflects these changes:

1
00:00:01,000——>00:00:05,000
<font color:"#FFFFFF">Welcome to our product showcase.</font>
2
00:00:05,500——>00:00:10, 000<font color="#000000">This device has multiple features.</font>
3
00:00:10,500——>00:00:15,000
<font color="#FFFFFF">Let's see how it works.</font>

All the subtitles were green (#00FF00), regardless of the video's changing backgrounds, which could make them hard to read, especially against green or similarly toned backgrounds. For the first subtitle, the adaptive subtitle color management engine detected a dark background and adjusted the color to white (#FFFFFF) for better visibility. For the second subtitle, the adaptive subtitle color management engine identified a light background, switching the subtitle color to black (#000000) for contrast. The third subtitle reverted to white (#FFFFFF) due to a dark background in that part of the video. This approach ensures optimal legibility by dynamically adjusting the subtitle color to match the changing video content.

The adaptive subtitle color management engine can support additional features include user preferences and adaptive functionality, data-driven refinement, and integration with platforms. In particular, the adaptive subtitle color management engine allows users to enable or disable adaptive subtitle color management through video player settings. Users can also customize certain aspects of the subtitle color management to suit their viewing preferences. User interaction data related to adaptive subtitle usage can be collected and analyzed. This data can help refine and optimize the adaptive subtitle color management engine's strategies for selecting contrast colors, leading to better subtitle visibility across different types of videos. The adaptive subtitle color management engine can be integrated into various platforms, such as item listing platforms with video content. Server-side scripts can analyze uploaded videos to suggest optimal subtitle color management strategies, improving accessibility for a broader audience.

In the context of an item listing system (e.g., where sellers upload videos showcasing their items) subtitles are used to improve accessibility by providing spoken descriptions in text form. The adaptive subtitle color management engine can be integrated into a video player system of the item listing system to ensure subtitle legibility across diverse visual backgrounds, enhancing both user engagement and accessibility. With the integration of the adaptive subtitle color management engine the item listing system can support additional integrated functionality related to user customization (e.g., user preferences and accessibility options), backend processing and API integration (e.g., server-side processing and API for third-party integration), and analytics-driven adjustments (e.g. user interaction data and A/B testing). Integrating the adaptive subtitle color management engine into an item listing system with user customization options, backend processing, and data-driven refinement enhances both accessibility and overall user experience, making subtitles more useful and engaging across diverse video content.

Advantageously, the embodiments of the present technical solution support providing an adaptive subtitle color management engine in an item listing system. The adaptive subtitle color management engine represents a significant advancement in subtitle technology by dynamically adjusting subtitle colors based on the constantly shifting visual content of videos. The adaptive subtitle color management engine enhances readability by automatically adjusting subtitle colors based on the background's brightness and color. This ensures high contrast between the subtitles and the video content, preventing situations where subtitles blend into the scene, making them difficult to read. By leveraging timestamp data from existing subtitle file formats (e.g., SRT, VTT), the system identifies the appropriate video frames and dynamically adjusts the subtitle colors as scenes transition. This real-time adaptation creates a seamless viewing experience without the need for manual intervention or static subtitle color settings. The technical solution operates within the existing subtitle file structure, eliminating the need for additional data files or complex modifications to video content. This makes the adaptive subtitle color management engine both efficient and easy to integrate into various video platforms, whether for pre-recorded or streamed video, without significant overhead or disruption to video processing workflows.

Example Systems and Resources

Figure 1B:
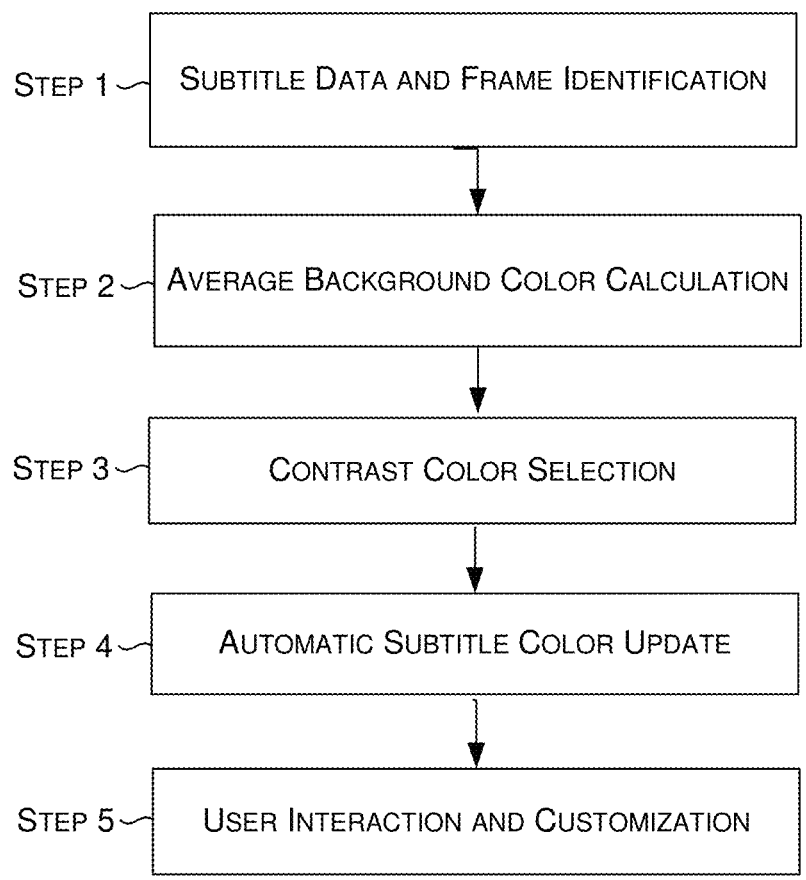
FIG. 1B is a schematic associated with adaptive subtitle color management in an item listing system, in accordance with aspects of the technology described herein.

Aspects of the technical solution can be described by way of examples and with reference to FIGS. 1A-1B. FIG. 1A illustrates an item listing system 100 that includes integrated item listing system 100A, adaptive subtitle color management engine 110, video player system 120, video player client 130, integrated item listing system resources. The item listing system 100 corresponds to item listing system 600 described below with reference to FIG. 6.

The item listing system 100 provides a system (e.g., integrated item listing system 100A) that includes an engine (e.g., adaptive subtitle color management engine 110) for performing operations (e.g., adaptive subtitle color management operations) discussed herein. Integrated item listing system 110A can be the central platform where users (e.g., sellers) can upload videos to showcase their products. Integrated item listing system 110A provides a user-friendly interface for sellers and viewers, plus Application Programming Interface (API) integrations for handling videos, subtitles, and customization options. Integrated item listing system 110A enables sellers to provide accessible content by including subtitles for their videos. Integrated item listing system 110A is responsible for handling the video and subtitle data, linking them to product listings, and offering an interface for user interactions. Integrated item listing system 110A can include product information, uploaded videos, subtitle files, and user profiles. Integrated item listing system 110A manages video and subtitle uploads, links videos to product listings, and facilitates subtitle display.

Video player system 120 is the backend engine that processes and renders video content, including subtitles, for playback. Video player system 120 interacts with the adaptive subtitle color management engine to synchronize subtitle display and ensure the correct color is applied. Video player system 120 supports pre-recorded and streamed video formats. Video player system 120 processes video files, subtitle files, and user preferences for subtitle settings. Video player system 120 renders video and subtitles, adjusts subtitle colors based on input from the color management engine, and ensures real-time playback synchronization. Video player system 120 further provides APIs and an interface for interacting with other system components like the video player client 130 and the adaptive subtitle color management engine 110.

Adaptive subtitle management engine 110 is responsible for ensuring subtitle text maintains high contrast with video backgrounds. Adaptive subtitle management engine 110 interfaces with the integrated item listing system 100A for managing subtitle and video uploads. Adaptive subtitle management engine 110 is analyzes video frames of video data, calculating background brightness and adjusting subtitle colors to either white or black based on predefined thresholds. Adaptive subtitle management engine 110 ensures subtitles are clearly visible throughout the entire video. Adaptive subtitle management engine 110 process subtitle file data, frame pixel intensity values, and average brightness levels. Adaptive subtitle management engine 11 analyzes video frames for brightness, calculates contrast colors, and updates subtitle colors in real-time. Adaptive subtitle management engine 110 interfaces with the video player system to collect frame data and apply subtitle color adjustments.

Video player client 130 refers to the frontend or client-side application used by viewers to watch video content (e.g., product videos) and interact with the integrated item listing system 100A. Video player client 130 is responsible for playing the video content and displaying the subtitles as they are dynamically updated by the adaptive subtitle color management engine. Video player client 130 provides the main user interface for viewers to watch videos, toggle subtitle settings, and interact with the platform. Video player client 130 interacts with the video player system 120 to present video content on a variety of devices, including desktop browsers, mobile apps, and other platforms. Video player client 130 receives video and subtitle data from the video player system for playback. Video player client 130 renders the video and synchronized subtitles in real-time; updates and displays subtitles based on the contrast color adjustments provided by the adaptive subtitle color management engine. Video player client 130 also applies user-specified settings for subtitle display, including color and background preferences.

With reference to FIG. 1B, FIG. 1B illustrates a schematic 100B associated with providing adaptive subtitle color management engine in accordance with embodiments described herein. The technical solution of the adaptive subtitle color management engine 110 can be explained by way of steps and an example practical video playback scenario. Video content can include video transitions between scenes with vastly different lighting conditions. The video content can have subtitles enabled for narration and dialogue.

The three scenes discussed are:

Scene 1: A Daytime Beach Scene—The background is bright, with sunlight reflecting off the sand and water. The overall brightness of the scene is high. Scene 2: A Sunset Forest Scene—As the scene shifts to a forest during sunset, the background darkens significantly, with rich, deep shadows from trees. Scene 3: A Nighttime City Scene—The video transitions to a nighttime scene in a city, where dim streetlights create soft, low light over the cityscape.

The adaptive subtitle process includes the following steps:

Step 1: Subtitle Data and Frame Identification. As the video content plays, the subtitle file provides information about when each subtitle appears (start and end timestamps). The adaptive subtitle color management engine 110 accesses the subtitle file and identifies the exact frames associated with the display of each subtitle during the video.

For instance: A subtitle in Scene 1 is shown from 00:02:15 to 00:02:20. A subtitle in Scene 2 appears between 00:05:10 and 00:05:15. A subtitle in Scene 3 appears between 00:08:30 and 00:08:35. The adaptive subtitle color management engine 110 identifies the corresponding video frames during these intervals.

Step 2: Average Background Color Calculation. Next, the adaptive subtitle color management engine 110 analyzes the subtitle display portion of each frame, where the subtitles will appear, to compute the average background color.

Scene 1 (Daytime Beach Scene): The subtitle display portion includes areas with bright blue sky, yellow sand, and reflective water. The adaptive subtitle color management engine 110 calculates the average pixel intensity of this region and finds a high brightness level. The adaptive subtitle color management engine 110 detects an average pixel intensity of 240 (on a scale of 0 to 255). Scene 2 (Sunset Forest Scene): As the scene changes to the forest at sunset, the subtitle display portion now includes areas with darker tree shadows and dim lighting. The average pixel intensity here is significantly lower, calculated at around 80. Scene 3 (Nighttime City Scene): In this dimly lit city scene, the subtitle display portion shows faintly illuminated buildings with streetlights. The average pixel intensity is even lower, around 30.

Step 3: Contrast Color Selection. Based on the computed average pixel intensity for each scene, the engine selects the appropriate contrast color to ensure subtitle visibility:

Scene 1 (Daytime Beach Scene). Since the background is very bright (average intensity of 240), the contrast color is set to black. Black subtitles will contrast sharply against the light-colored sand and sky, making them easy to read. Scene 2 (Sunset Forest Scene): Here, the background is much darker, with an average intensity of 80. The adaptive subtitle color management engine 110 switches the subtitle color to white, ensuring the text stands out clearly against the shadows and dim lighting. Scene 3 (Nighttime City Scene): With an even darker background (intensity of 30), the engine again chooses white subtitles to maintain high contrast against the low-light cityscape.

Step 4: Automatic Subtitle Color Update. As the video progresses, the adaptive subtitle color management engine 110 automatically updates the subtitle colors for each scene. This update is based on the dynamic calculations of background brightness for each subtitle display portion.

In Scene 1, subtitles are displayed in black to contrast against the bright beach. In Scene 2, the engine dynamically switches subtitles to white as the scene darkens. In Scene 3, the engine keeps subtitles white to maintain visibility in the low-light city scene.

Step 5: User Interaction and Customization. If the user has enabled adaptive subtitle color management in their video player settings, they will benefit from seamless transitions between different subtitle colors as the background changes. Users can also opt to fine-tune these settings, allowing for a personalized viewing experience based on their preferences. For instance, if the user prefers yellow subtitles for better visibility, they can customize the engine's settings to always use yellow, regardless of background brightness.

The technical solution can be integrated into an item listing system, such as an online marketplace featuring video listings. In this case, when sellers upload videos to showcase products, the adaptive subtitle color management engine 110 can analyze the background and suggest optimal subtitle colors to enhance visibility.

For example: a seller uploads a video featuring a product demonstration in a bright, well-lit room. Adaptive subtitle color management engine 110 suggests black subtitles for maximum contrast. If the same product video transitions to a dimly lit evening scene, the adaptive subtitle color management engine 110 automatically updates the subtitle color to white for better legibility. Additionally, user interaction data with these adaptive subtitles can be collected and analyzed to improve future color selection strategies.

Adaptive subtitle color management engine 110 ensures that subtitles remain legible by dynamically adjusting subtitle colors based on the changing brightness and color of the video background. Through precise analysis of pixel intensity and contrast color selection, the engine creates an optimal viewing experience, enhancing both accessibility and user engagement in a wide variety of video content.

In one embodiment, the adaptive subtitle color management engine 110 is configured to address cases where the original subtitle file does not support color formatting. Adaptive subtitle color management engine 110 first identifies when a subtitle file lacks the capability to format subtitle colors, a limitation common in certain formats like SRT files. Upon detection, the adaptive subtitle color management engine 110 generates a new, updated subtitle file that supports color formatting, allowing it to adapt subtitle colors dynamically based on the video's changing background.

The process begins by accessing the subtitle file and using its data, including timestamps, to identify the segments where subtitles appear. Based on the video data and the subtitle timestamps, the adaptive subtitle color management engine 110 analyzes each associated video frame, particularly the portion where subtitles are displayed. The average background color in that portion is computed through a color averaging operation, which calculates pixel brightness to determine whether the background is predominantly dark or light. A contrast color is then assigned—white for dark backgrounds or black for light backgrounds—to ensure subtitle legibility.

When the adaptive subtitle color management engine 110 determines that the subtitle file does not support color formatting, it generates a new file, integrating the computed contrast colors for each subtitle segment. This new file allows the video player to automatically update subtitle colors in real time as the video progresses, adapting to each scene's lighting and color changes. The adaptive subtitle color management engine 110 also repeats the process for subsequent subtitles, computing the background color for each frame and updating the contrast color accordingly. It is contemplated that the adaptive color management functionality can be selectively enabled by users. Through the video player's settings, users can decide whether to activate this feature, giving them control over the viewing experience. The generation of an updated subtitle file not only overcomes format limitations but also streamlines the process by allowing automatic subtitle color adaptation without requiring manual intervention. By leveraging existing subtitle data and dynamically computing contrast colors, the adaptive subtitle color management engine 110 provides a more flexible and accessible approach to subtitle management in dynamic video content.

Figure 2:
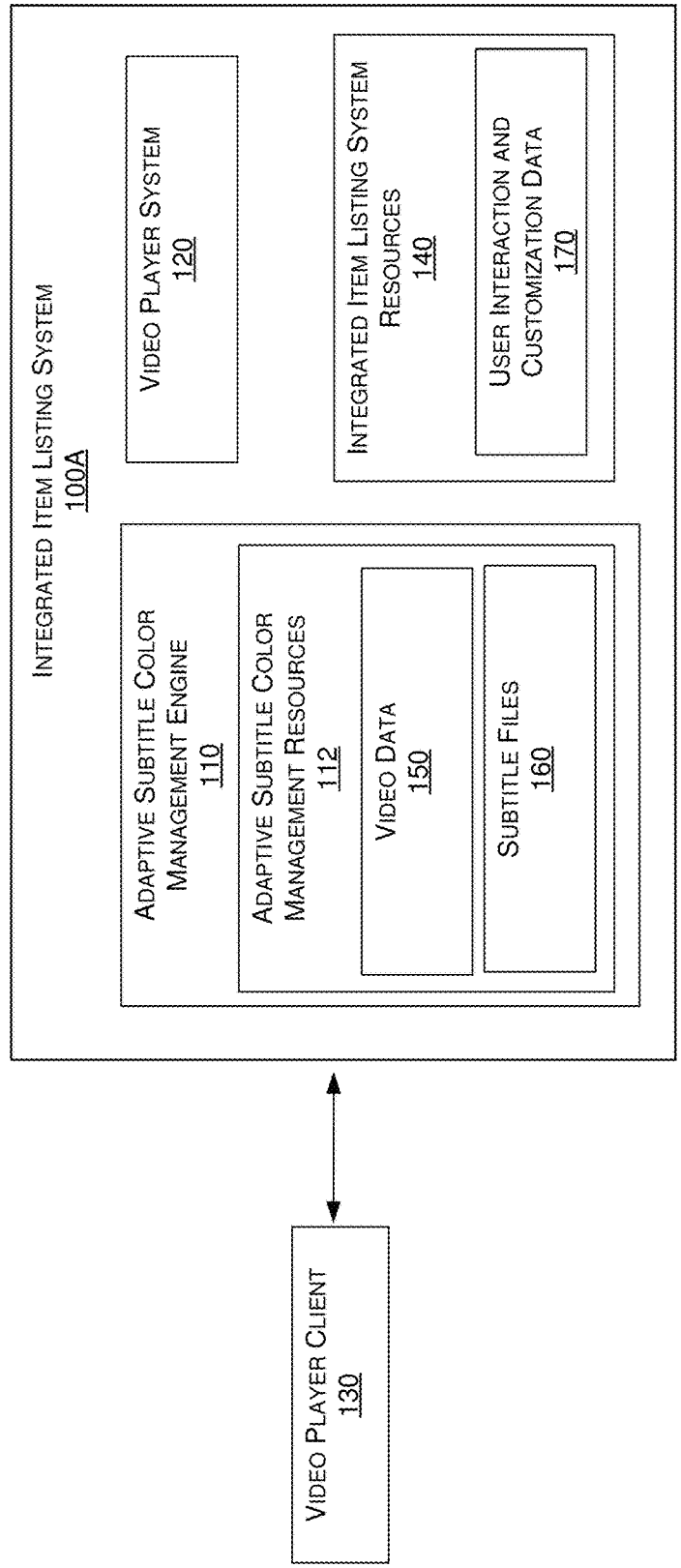
FIG. 2 is a block diagram of a video player system for providing adaptive subtitle color management, in accordance with aspects of the technology described herein.

Aspects of the technical solution can be described by way of examples and with reference to FIG. 2. FIG. 2 is a block diagram of an exemplary technical solution environment, based on example environments described with reference to FIGS. 6, 7 and 8 for use in implementing embodiments of the technical solution are shown. Generally the technical solution environment includes a technical solution system suitable for providing the example item listing system 100 in which methods of the present disclosure may be employed. In particular, FIG. 2 shows a high level architecture of the item listing system 100 in accordance with implementations of the present disclosure. Among other engines, managers, generators, selectors, or components not shown (collectively referred to herein as "components"), the item list platform system 100 of FIG. 2 corresponds to FIG. 1.

With reference to FIG. 2, FIG. 2 illustrates integrated item listing system 100A including adaptive subtitle color management engine 110, adaptive subtitle color management resources 112 including video data 150 and subtitles 160; video player system 120; video player client 130, and integrated item listing system resources 140 including Functionality associated with the adaptive subtitle color management engine 110 is provided using adaptive subtitle color management resources 112 and integrated item listing system resources 140 and their corresponding data, interfaces and operations. Adaptive subtitle color management resources 112 are ensure subtitle text remains legible throughout video playback by dynamically adjusting subtitle colors based on the video's background. Adaptive subtitle color management resources 112 includes video frame data (brightness and color information), subtitle files (SRT, VTT), pixel intensity calculations, and user customization preferences (e.g., high-contrast mode). Adaptive subtitle color management engine 110 interacts with the video player system, subtitle files, and external APIs for subtitle customization. It also interfaces with user preferences and settings stored in profiles or cookies, ensuring personalized subtitle adjustments. Adaptive subtitle color management engine 110 conducts real-time analysis of video frames to compute average background color, selects appropriate contrast colors, and updates subtitle color accordingly. Adaptive subtitle color management engine 110 applies these operations for each subtitle frame, ensuring smooth and adaptive subtitle visibility across various video content.

Integrated item listing system resources 140 are the backend components that support video content management and playback within a product listing platform, allowing sellers to showcase their products using videos with enhanced subtitle accessibility. Integrated item listing system resources 140 can include product listing details, video files, subtitle data, metadata related to product descriptions, and user interaction data (e.g., video views, subtitle preferences). Integrated item listing system resources 140 may also store video analytics and tracking information. Integrated item listing system 110A interconnects the video player system 120 and adaptive subtitle color management engine, allowing seamless integration of videos into item listings. Integrated item listing system 110A can support user profiles, seller dashboards, and analytics tools to provide insights and recommendations. Integrated item listing system 110A handles video uploads, manages subtitle synchronization, and enables adaptive subtitle features for enhanced accessibility. Integrated item listing system 110A also allows sellers to include subtitles in their product videos, processes server-side data to optimize subtitle visibility, and tracks user interactions to refine the video and subtitle experience.

Video data 150 represents the multimedia content associated with product listings, which can be either pre-recorded or streamed. Adaptive subtitle color management engine 110 processes this data to extract the necessary information for background brightness analysis to adjust subtitle colors dynamically. Video data 150 includes video frames and metadata related to video content (e.g., format, resolution).

Subtitle files 160 contain the structured data necessary to display subtitles in sync with video playback. These files include text segments, timing information, and initial color settings. Subtitle files 160 are provided for adaptive subtitle color management because they provide the timestamps needed to match subtitle display with corresponding video frames. Subtitle files 160 include subtitle text, start/end times, and style information. Adaptive subtitle color management engine 110 extracts timestamp and text data from these files, calculates appropriate subtitle colors, and updates the files dynamically during video playback.

Implementing adaptive subtitle color management by utilizing existing subtitle file formats like SRT or VTT offers several notable advantages. These formats provide the necessary timestamp synchronization, contextual information, and efficient use of resources, making it possible to implement dynamic subtitle adjustments in real-time and without needing extra data structures.

SRT and VTT files include precise timestamp data that indicates when each subtitle should appear and disappear during video playback. This allows adaptive subtitle color management engine 110 to accurately identify the exact frames where subtitles need to be rendered and adjust their colors in real-time, based on the dynamic background conditions of the video. Since subtitles are inherently linked to the timing of video content, these timestamps ensure that color adjustments are synchronized with scene transitions and lighting changes.

Subtitle files not only contain the textual content of subtitles but may also include metadata, such as style tags or information about the subtitle's role in the narrative. By analyzing this data, the adaptive system can adjust subtitle colors based on the context of the scene. For instance, a subtitle appearing during a high-action scene with rapidly changing colors might be adjusted to provide higher contrast and visibility, while subtitles in quieter or less dynamic scenes could remain with default settings. This contextual adaptation improves visibility and enhances the viewing experience.

Since SRT and VTT files follow a structured format with existing subtitle and timing data, the adaptive color management system can be implemented without the need for additional data files. By leveraging the existing framework, developers can integrate adaptive subtitle color functionality with minimal disruption to the standard subtitle rendering process. This approach simplifies implementation while still delivering effective real-time color management based on video content.

User interaction and customization data 170 refer to the information collected and managed regarding how users engage with videos and subtitles on the platform, as well as their personalized subtitle preferences. User interaction and customization data 170 supports enhancing user experience and accessibility, particularly for features like adaptive subtitle color management.

User interaction and customization data 170 can include user activity data such as whether subtitles are turned on or off, how often users adjust subtitle settings (e.g., font size, color), and interaction metrics like video playtime, rewinds, or pauses. Customization data includes individual preferences for subtitle appearance-such as preferred subtitle color, background opacity, high-contrast settings, and modes for color-blind users. This data may be stored in cookies, user profiles, or session data.

Adaptive subtitle color management engine 110 operates with the video player system 120 and user profiles to apply preferences during video playback. Adaptive subtitle color management engine 110 also interfaces with analytics systems that track engagement, and may connect with APIs for external user preference storage or synchronization across platforms. The interface enables real-time adjustments as users modify subtitle settings or when the system auto-adjusts based on video content. Adaptive subtitle color management engine 110 collects real-time user interaction data, such as subtitle toggles and adjustments made during video playback. Adaptive subtitle color management engine 110 then uses this data to customize the subtitle experience, applying preferred colors or display settings. It also processes user feedback to refine subtitle visibility strategies, personalizing the video experience. On the backend, this data is aggregated for analysis, helping to optimize user engagement and enhance future product videos with refined subtitle color management strategies.

With the integration of the adaptive subtitle color management engine 100 the integrated item listing system 100A can support additional integrated functionality related to user customization (e.g., user preferences and accessibility options), backend processing and API integration (e.g., server-side processing and API for third-party integration), and analytics-driven adjustments (e.g. user interaction data and A/B testing).

Integrated item listing system 100A allows users to set preferred subtitle colors and background settings through user profiles or stored preferences (e.g., via cookies). Integrated item listing system 100A will then adjust colors automatically based on these user settings each time they interact with the video player. This ensures a personalized and consistent viewing experience. To cater to users with visual impairments, the platform offers high-contrast modes or color-blind friendly options, allowing users to select settings that best fit their needs. These options improve overall accessibility and user satisfaction. Before videos are uploaded to the integrated item listing system 100A, server-side scripts analyze the video content to suggest optimal subtitle colors based on the overall color scheme of the video. Sellers can then receive recommendations on the best subtitle color choices, ensuring maximum visibility and readability for potential buyers. An API can be developed that allows third-party video editing tools to utilize the adaptive subtitle color functionality. This would enable seamless integration across various platforms, extending the adaptive engine's utility beyond a single platform.

Integrated item listing system 100A can collect and analyze user interaction data, such as how often subtitles are enabled or adjusted. This data can be used to refine the subtitle color management strategies, ensuring better user experience for future video uploads. By implementing A/B testing, the platform can determine which subtitle color adjustments lead to improved user engagement and retention. This approach allows for data-driven decisions to optimize subtitle presentation based on real user behavior.

Example Methods

Figure 3:
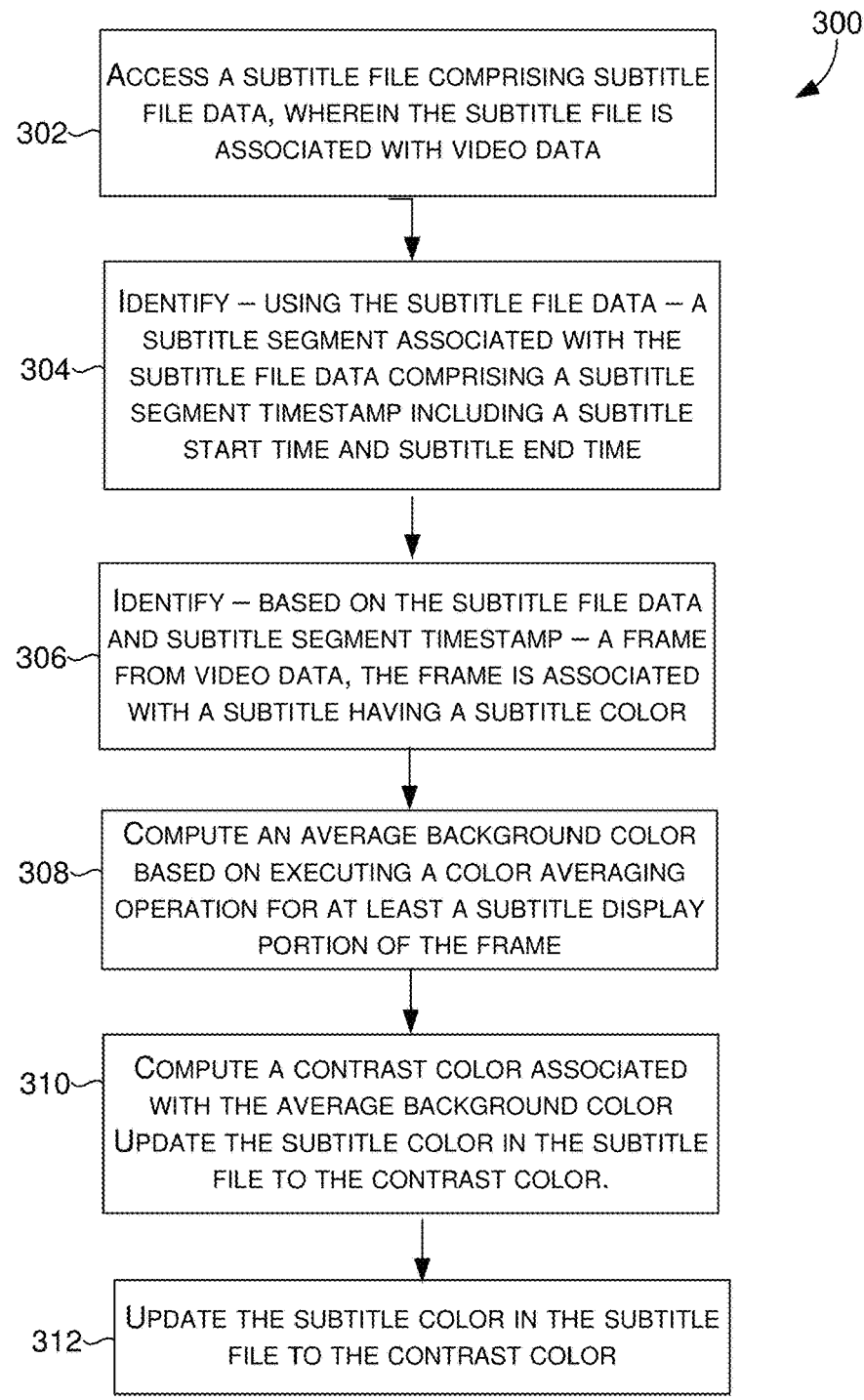
FIG. 3 provides a first exemplary method of providing LLM-based labeler development management in a video player system, in accordance with aspects of the technology described herein.
Figure 4:
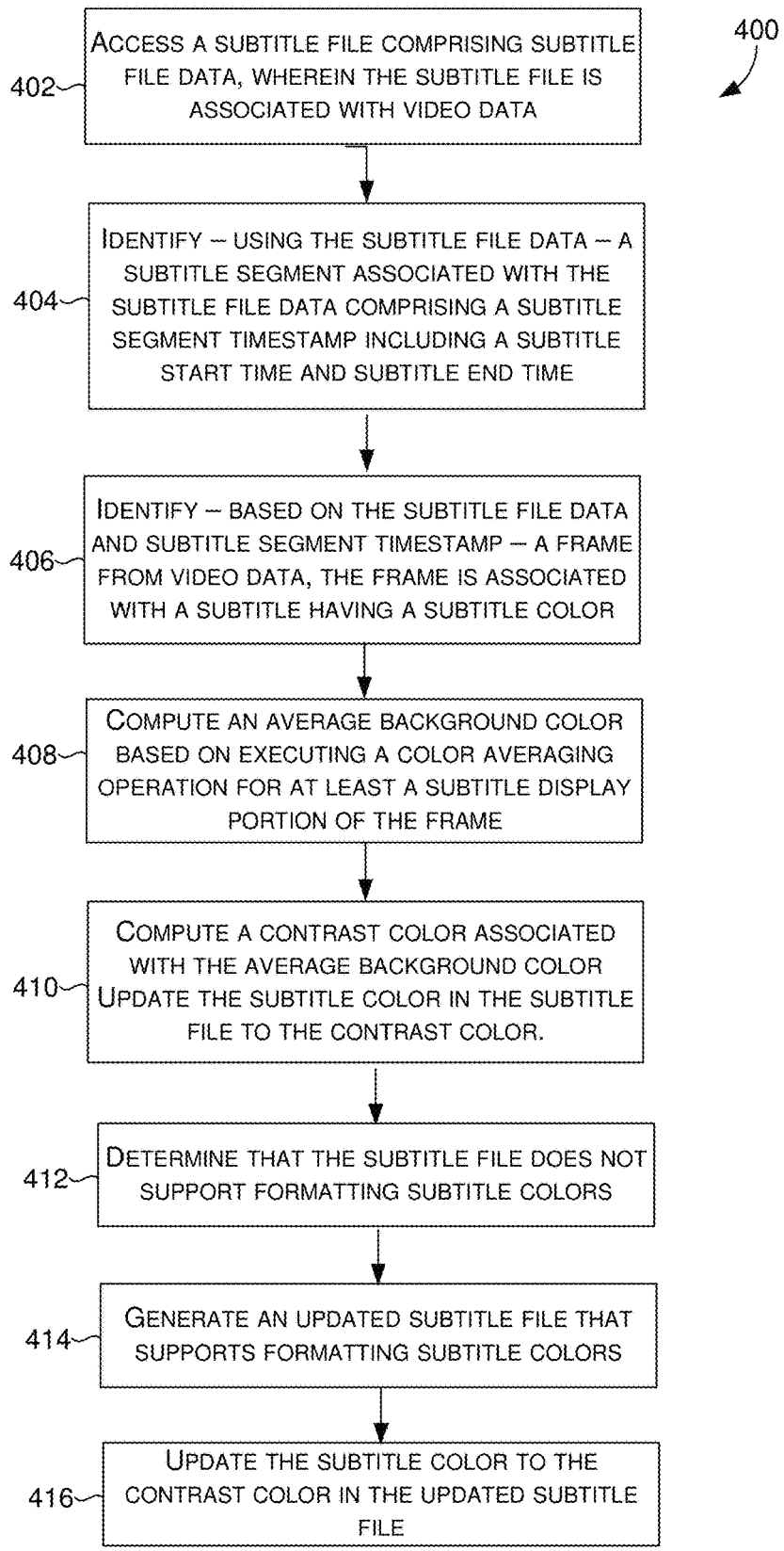
FIG. 4 provides a second exemplary method of providing LLM-based labeler development management in a video player system, in accordance with aspects of the technology described herein.
Figure 5:
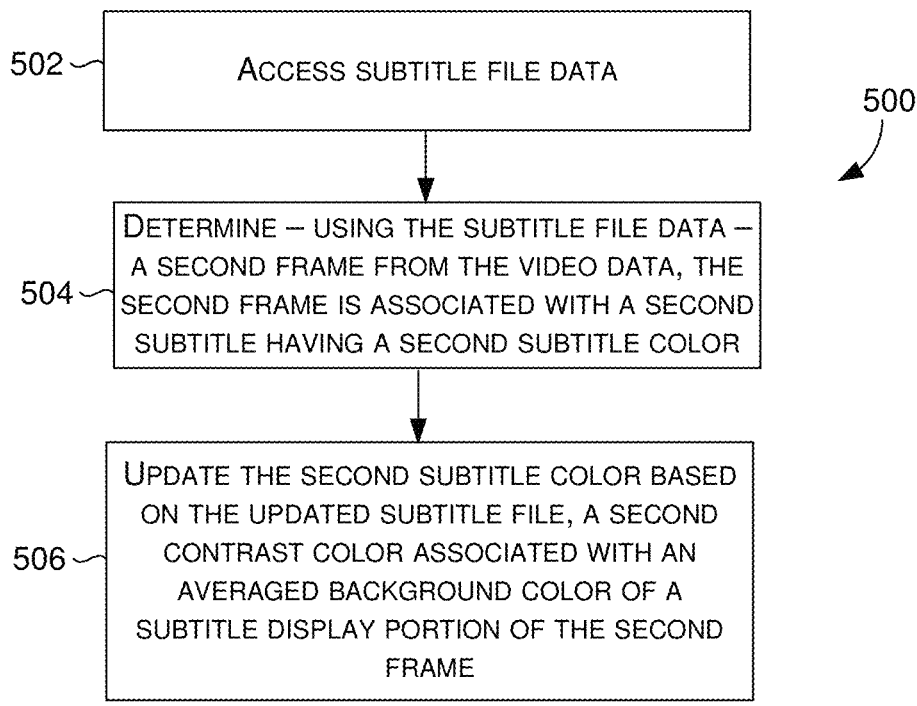
FIG. 5 provides a third exemplary method of providing LLM-based labeler development management in a video player system, in accordance with aspects of the technology described herein FIG. 6 provides a block diagram of an exemplary item listing system computing environment suitable for use in implementing aspects of the technology described herein.

With reference to FIGS. 3, 4, and 5 flow diagrams that illustrate methods for providing an adaptive subtitle color management engine in a video player system. The methods may be performed using the item listing system described herein. In embodiments, one or more computer-storage media having computer-executable or computer-useable instructions embodied thereon that, when executed, by one or more processors can cause the one or more processors to perform the methods (e.g., computer implemented method) in an item listing system (e.g., computerized system or computer system).

Turning to FIG. 3, a flow diagram is provided that illustrates a method 300 for providing an adaptive subtitle color management engine in a video player system. At block 302, access a subtitle file comprising subtitle file data, wherein the subtitle file is associated with video data. At block 304, identify—using the subtitle file data—a subtitle segment associated with the subtitle file data comprising a subtitle segment timestamp including a subtitle start time and subtitle end time. At block 306, based on the subtitle file data and subtitle segment timestamp, identify a frame from video data, the frame is associated with a subtitle having a subtitle color. At block 308, compute an average background color based on executing a color averaging operation for at least a subtitle display portion of the frame. At block 310, compute a contrast color associated with the average background color. At block 312, automatically update the subtitle color in the subtitle file to the contrast color.

Turning to FIG. 4, a flow diagram is provided that illustrates a method 400 for providing an adaptive subtitle color management engine in a video player system. At block 402, access a subtitle file comprising subtitle file data, wherein the subtitle file is associated with video data. At block 404, identify—using the subtitle file data—a subtitle segment associated with subtitle file data comprising a subtitle segment timestamp including a subtitle start time and subtitle end time. At block 406, based on the subtitle file data and subtitle segment timestamp, identifying a frame from video data, the frame is associated with a subtitle having a subtitle color. At block 408, compute an average background color based on executing a color averaging operation for at least a subtitle display portion of the frame. At block 410, compute a contrast color associated with the average background color. At block 412, determine that the subtitle file does not support formatting subtitle colors. At block 414, generate an updated subtitle file that supports formatting subtitle colors. At block 416, update the subtitle color to the contrast color in the updated subtitle file.

Turning to FIG. 5, a flow diagram is provided that illustrates a method 500 for providing an Adaptive subtitle color management engine in a video player system. At block 502, access subtitle file data. At block 504, determine—using the subtitle file data—a second frame from the video data, the second frame is associated with a second subtitle having a second subtitle color. At block 506, automatically update the second subtitle color based on the updated subtitle file, a second contrast color associated with an averaged background color of a subtitle display portion of the second frame.

Technical Improvement

Embodiments of the present invention have been described with reference to several inventive features (e.g., operations, systems, engines, and components) associated with an item listing system. Inventive features described include: operations, interfaces, data structures, and arrangements of computing resources associated with providing the functionality described herein relative with reference to an adaptive subtitle color management engine associated with an integrated item listing system.

Embodiments of the present invention relate to the field of computing, and more particularly to a video player system. The following described exemplary embodiments provide a system, method, and program product to, among other things, execute generative adaptive subtitle color management operations that provide adaptive subtitle color management. Therefore, the present embodiments improve the technical field of video technology and item listing platform technology by providing more effective integrated item listing system functionality. For example, adaptive subtitle color management engine represents a significant advancement in subtitle technology by dynamically adjusting subtitle colors based on the constantly shifting visual content of videos. The adaptive subtitle color management engine enhances readability by automatically adjusting subtitle colors based on the background's brightness and color. This ensures high contrast between the subtitles and the video content, preventing situations where subtitles blend into the scene, making them difficult to read. By leveraging timestamp data from existing subtitle file formats (e.g., SRT, VTT), the system identifies the appropriate video frames and dynamically adjusts the subtitle colors as scenes transition. This real-time adaptation creates a seamless viewing experience without the need for manual intervention or static subtitle color settings. The technical solution operates within the existing subtitle file structure, eliminating the need for additional data files or complex modifications to video content. This makes the adaptive subtitle color management engine both efficient and easy to integrate into various video platforms, whether for pre-recorded or streamed video, without significant overhead or disruption to video processing workflows.

Functionality of the embodiments of the present invention have further been described, by way of an implementation and anecdotal examples—to demonstrate that the operations for providing adaptive subtitle color management using an adaptive subtitle color management engine in an item listing system as a solution to a specific problem in video technology to improve computing operations in artificial intelligence systems. Overall, these improvements result in less CPU computation, smaller memory requirements, and increased flexibility in artificial intelligence systems when compared to previous conventional artificial intelligence system operations performed for similar functionality.

Additional Support for Detailed Description of the Invention

Example Item Listing System Environment

Figure 6:
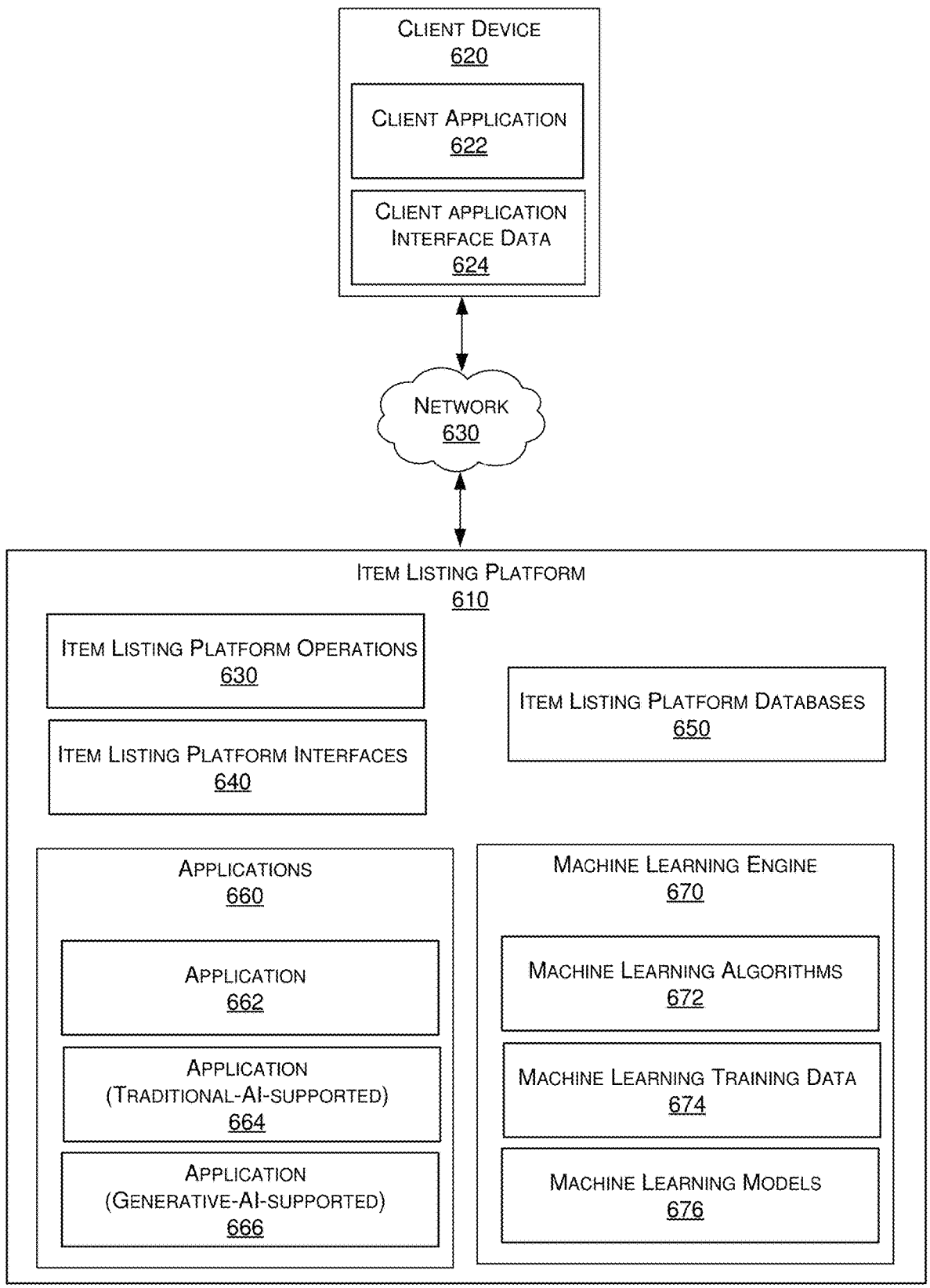

Referring now to FIG. 6, FIG. 6 illustrates an example item listing system 600 computing environment in which implementations of the present disclosure may be employed. In particular, FIG. 6 shows a high level architecture of an example item listing platform 610 that can host a technical solution environment, or a portion thereof. It should be understood that this and other arrangements described herein are set forth as examples. For example, as described above, many elements described herein may be implemented as discrete or distributed components or in conjunction with other components, and in any suitable combination and location. Other arrangements and elements (e.g., machines, interfaces, functions, orders, and groupings of functions) can be used in addition to or instead of those shown.

The item listing system 600 can be a cloud computing environment that provides computing resources for functionality associated with the item listing platform 610. For example, the item listing system 600 supports delivery of computing components and services-including servers, storage, databases, networking, applications, and machine learning associated with the item listing platform 610 and client device 620. A plurality of client devices (e.g., client device 620) include hardware or software that access resources on the item listing system 600. Client device 620 can include an application (e.g., client application 622) and interface data (e.g., client application interface data 624) that support client-side functionality associated with the item listing system. The plurality of client devices can access computing components of the item listing system 600 via a network (e.g., network 630) to perform computing operations.

The item listing platform 610 is responsible for providing a computing environment or architecture that includes the infrastructure that supports providing item listing platform functionality (e.g., e-commerce functionality). The item listing platform support storing item in item databases and providing a search system for receiving queries and identifying search results based on the queries. The item listing platform may also provide a computing environment with features for managing, selling, buying, and recommending different types of items. Item listing platform 610 can specifically be for a content platform such as EBAY content platform or e-commerce platform, developed by EBAY INC., of San Jose, California.

The item listing platform 610 can provide item listing operations 630 and item listing interfaces 640. The item listing operations 630 can include service operations, communication operations, resource management operations, security operations, and fault tolerance operations that support specific tasks or functions in the item listing platform 610. The item listing interfaces 640 can include service interfaces, communication interfaces, resource interfaces, security interfaces, and management and monitoring interfaces that support functionality between the item listing platform components. The item listing operations 630 and item listing interfaces 640 can enable communication, coordination and seamless functioning of the item listing system 600.

By way of example, functionality associated with item listing platform 610 can include shopping operations (e.g., product search and browsing, product selection and shopping cart, checkout and payment, and order tracking); user account operations (e.g., user registration and authentication, and user profiles); seller and product management operations (e.g., seller registration and product listing and inventory management); payment and financial operations (e.g., payment processing, refunds and returns); order fulfillment operations (e.g., order processing and fulfillment and inventory management); customer support and communication interfaces (e.g., customer support chat/email and notifications); security and privacy interfaces (e.g., authentication and authorization, payment security); recommendation and personalization interfaces (e.g., product recommendations and customer reviews and ratings); analytics and report interfaces (e.g., sales and inventory reports, and user behavior analytics); and APIs and Integration Interfaces (e.g., APIs for Third-Party Integration).

The item listing platform 610 can provide item listing platform databases (e.g., item listing platform databases 650) to manage and store different types of data efficiently. The item listing platform databases 650 can include relational databases, NoSQL databases, search databases, cache databases, content management systems, analytics databases, payment gateway database, customer relationship management databases, log and error databases, inventory and supply chain databases, and multi-channel databases that are used in combination to efficiently manage data and provide e-commerce experience for users.

The item listing platform 610 supports applications (e.g., applications 660) that is a computer program or software component or service that serves a specific function or set of functions to fulfil a particular item listing platform requirement or user requirement. Applications can be client-side (user-facing) and server-side (backend). Applications can also include application without any AI support (e.g., application 662) application supported by traditional AI model (e.g., application 664), and applications supported by generative AI models (e.g., application 666). By way of example, applications can include an online storefront application, mobile shopping app, admin and management console, payment gateway integration, user account and authentication application, search and recommendation engines, inventory and stock management application, order processing and fulfillment application, customer support and communication tools, content management system, analytics and report applications, marketing and promotion applications, multi-channel integration applications, log and error tracking applications, customer relationship management (CRM) applications, security applications, and APIs and web services that are used in combination to efficiently deliver e-commerce experiences for users.

The items listing platform 610 can include a machine learning engine (e.g., machine learning engine 670). The machine learning engine 670 refers to machine learning framework or machine learning platform that provides the infrastructure and tools to design, train, evaluate, and deploy machine learning models. The machine learning engine 670 can serve as the backbone for developing and deploying machine learning applications and solutions. Machine learning engine 670 can also provide tools for visualizing data and model results, as well as interpreting model decisions to gain insights into how the model is making predictions.

The machine learning engine 670 can provide the necessary libraries, algorithms, and utilities to perform various tasks within the machine learning workflow. The machine learning workflow can include data processing, model selection, model training, model evaluation, hyperparameter tuning, scalability, model deployment, inference, integration, customization, data visualization. Machine learning engine 670 can include pre-trained models for various tasks, simplifying the development process. In this way, the machine learning engine 670 can streamline the entire machine learning process, from data preparation and model training to deployment and inference, making it accessible and efficient for different types of users (e.g., customers, data scientists, machine learning engineers, and developers) working on a wide range of machine learning applications.

Machine learning engine 670 can be implemented in the item listing system 600 as a component that leverages machine learning algorithms and techniques (e.g., machine learning algorithms 672) to enhance various aspects of the item listing system's functionality. Machine learning engine 670 can provide a selection of machine learning algorithms and techniques used to teach computers to learn from data and make predictions or decisions without being explicitly programmed. These techniques are widely used in various applications across different industries, and can include the following examples: supervised learning (e.g., linear regression: classification, support vector machines (SVM); unsupervised learning (e.g., clustering, principal component analysis (PCA), association rules (e.g., apriori); reinforcement learning (e.g., Q-Learning, deep Q-Network (DQN); and deep learning (e.g., neural networks, convolutional neural networks (CNN), and recurrent neural networks (RNN); and ensemble learning random forest.

Machine learning training data 120 supports the process of building, training, and fine-tuning machine learning models. Machine learning training data 120 consists of a labeled dataset that is used to teach a machine learning model to recognize patterns, make predictions, or perform specific tasks. Training data typically comprises two main components: input feature (X) and labels or target values (Y). Input features can include variables, attributes, or characteristics used as input to the machine learning model. Input features (X) can be numeric, categorical, or even textual, depending on the nature of the problem. For example, in a model for predicting house prices, input features might include the number of bedrooms, square footage, neighborhood, and so on. Labels or target values (Y) include the values that the model aims to predict or classify. Labels represent the desired output or the ground truth for each corresponding set of input features. For instance, in a spam email classifier, the labels would indicate whether each email is spam or not (i.e., binary classification). The training process involves presenting the model with the training data, and the model learns to make predictions or decisions by identifying patterns and relationships between the input features (X) and the target values (Y). A machine learning algorithm adjusts its internal parameters during training in order to minimize the difference between its predictions and the actual labels in the training data. Machine learning engine 670 can use historical and real-time data to train models and make predictions, continually improving performance and user experience.

Machine learning engine 670 can include machine learning models (e.g., machine learning models 676) generated using the machine learning engine workflow. Machine learning models 676 can include generative AI models and traditional AI models that can both be employed in the item listing system 600. Generative AI models are designed to generate new data, often in the form of text, images, or other media, based on patterns and knowledge learned from existing data. Generative AI models can be employed in various ways including: content generation, product image generation, personalized product recommendations, natural language chatbots, and content summarization. Traditional AI models encompass a wide range of algorithms and techniques and can be employed in various ways including: recommendation systems, predictive analytics, search algorithms, fraud detection, customer segmentation, image classification, Natural Language Processing (NLP) and A/B testing and optimization. In many cases, a combination of both generative and traditional AI models can be employed to provide a well-rounded and effective e-commerce experience, combining data-driven insights and creativity.

Machine learning engine 670 can be used to analyze data, make predictions, and automate processes to provide a more personalized and efficient shopping experience for users. By way of example, product recommendations search and filtering: pricing optimization, inventory and stock management: customer segmentation, churn prediction and retention, fraud detection, sentiment analysis, customer support and chatbots, image and video analysis, and ad targeting and marketing. The specific applications of machine learning within the item listing platform 610 can vary depending on the specific goals, available data, and resources.

Example Distributed Computing System Environment

Figure 7:
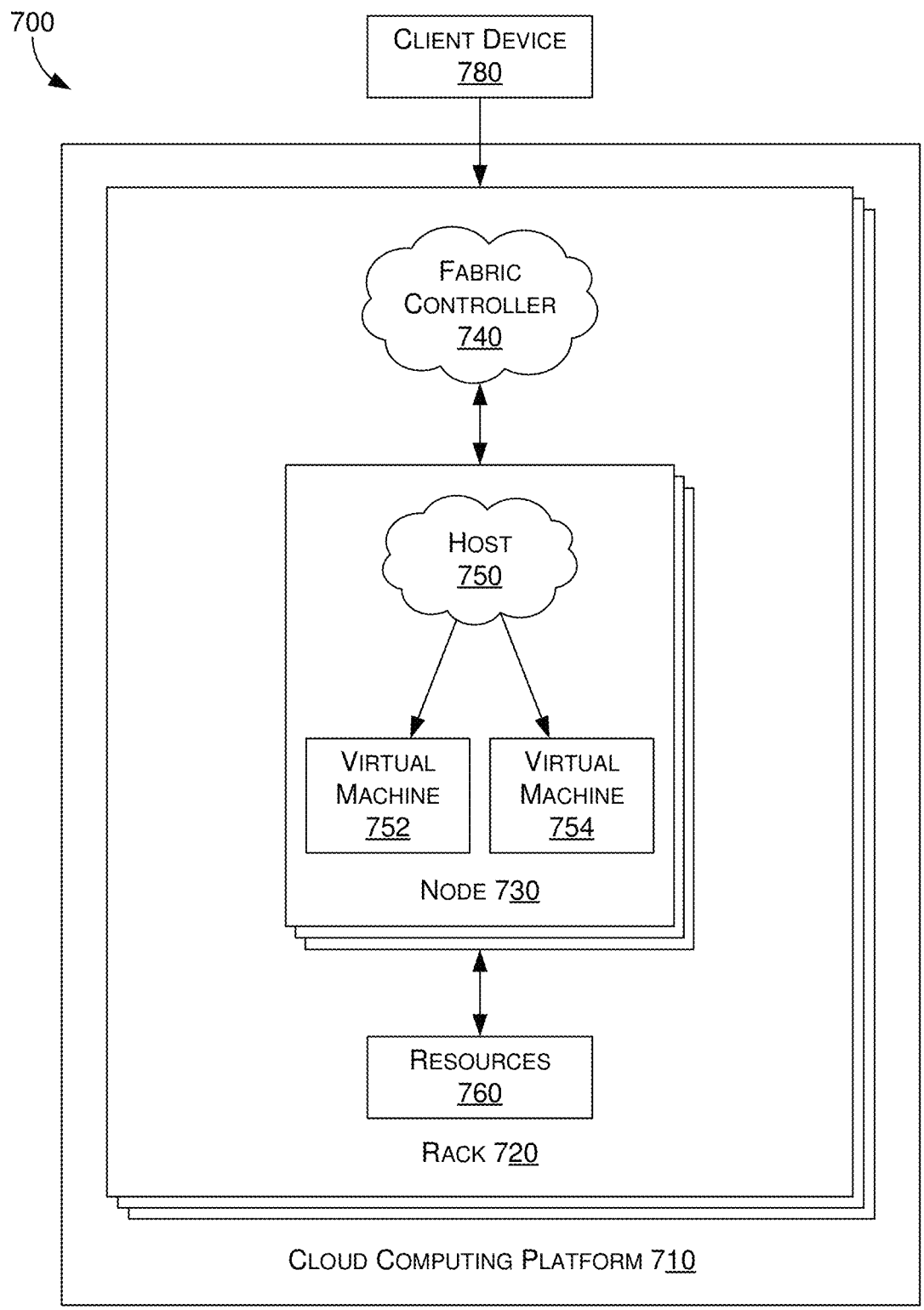
FIG. 7 provides a block diagram of an exemplary distributed computing environment suitable for use in implementing aspects of the technology described herein.

Referring now to FIG. 7, FIG. 7 illustrates an example distributed computing environment 700 in which implementations of the present disclosure may be employed. In particular, FIG. 7 shows a high level architecture of an example cloud computing platform 710 that can host a technical solution environment, or a portion thereof (e.g., a data trustee environment). It should be understood that this and other arrangements described herein are set forth only as examples. For example, as described above, many of the elements described herein may be implemented as discrete or distributed components or in conjunction with other components, and in any suitable combination and location. Other arrangements and elements (e.g., machines, interfaces, functions, orders, and groupings of functions) can be used in addition to or instead of those shown.

Data centers can support distributed computing environment 700 that includes cloud computing platform 710, rack 720, and node 730 (e.g., computing devices, processing units, or blades) in rack 720. The technical solution environment can be implemented with cloud computing platform 710 that runs cloud services across different data centers and geographic regions. Cloud computing platform 710 can implement fabric controller 740 component for provisioning and managing resource allocation, deployment, upgrade, and management of cloud services. Typically, cloud computing platform 710 acts to store data or run service applications in a distributed manner. Cloud computing infrastructure 710 in a data center can be configured to host and support operation of endpoints of a particular service application. Cloud computing infrastructure 710 may be a public cloud, a private cloud, or a dedicated cloud.

Node 730 can be provisioned with host 750 (e.g., operating system or runtime environment) running a defined software stack on node 730. Node 730 can also be configured to perform specialized functionality (e.g., compute nodes or storage nodes) within cloud computing platform 710. Node 730 is allocated to run one or more portions of a service application of a tenant. A tenant can refer to a customer utilizing resources of cloud computing platform 710. Service application components of cloud computing platform 710 that support a particular tenant can be referred to as a multi-tenant infrastructure or tenancy. The terms service application, application, or service are used interchangeably herein and broadly refer to any software, or portions of software, that run on top of, or access storage and compute device locations within, a datacenter.

When more than one separate service application is being supported by nodes 730, nodes 730 may be partitioned into virtual machines (e.g., virtual machine 752 and virtual machine 754). Physical machines can also concurrently run separate service applications. The virtual machines or physical machines can be configured as individualized computing environments that are supported by resources 760 (e.g., hardware resources and software resources) in cloud computing platform 710. It is contemplated that resources can be configured for specific service applications. Further, each service application may be divided into functional portions such that each functional portion is able to run on a separate virtual machine. In cloud computing platform 710, multiple servers may be used to run service applications and perform data storage operations in a cluster. In particular, the servers may perform data operations independently but exposed as a single device referred to as a cluster. Each server in the cluster can be implemented as a node.

Client device 780 may be linked to a service application in cloud computing platform 710. Client device 780 may be any type of computing device, which may correspond to computing device 700 described with reference to FIG. 7, for example, client device 780 can be configured to issue commands to cloud computing platform 710. In embodiments, client device 780 may communicate with service applications through a virtual Internet Protocol (IP) and load balancer or other means that direct communication requests to designated endpoints in cloud computing platform 710. The components of cloud computing platform 710 may communicate with each other over a network (not shown), which may include, without limitation, one or more local area networks (LANs) and/or wide area networks (WANs).

Example Computing Environment

Figure 8:
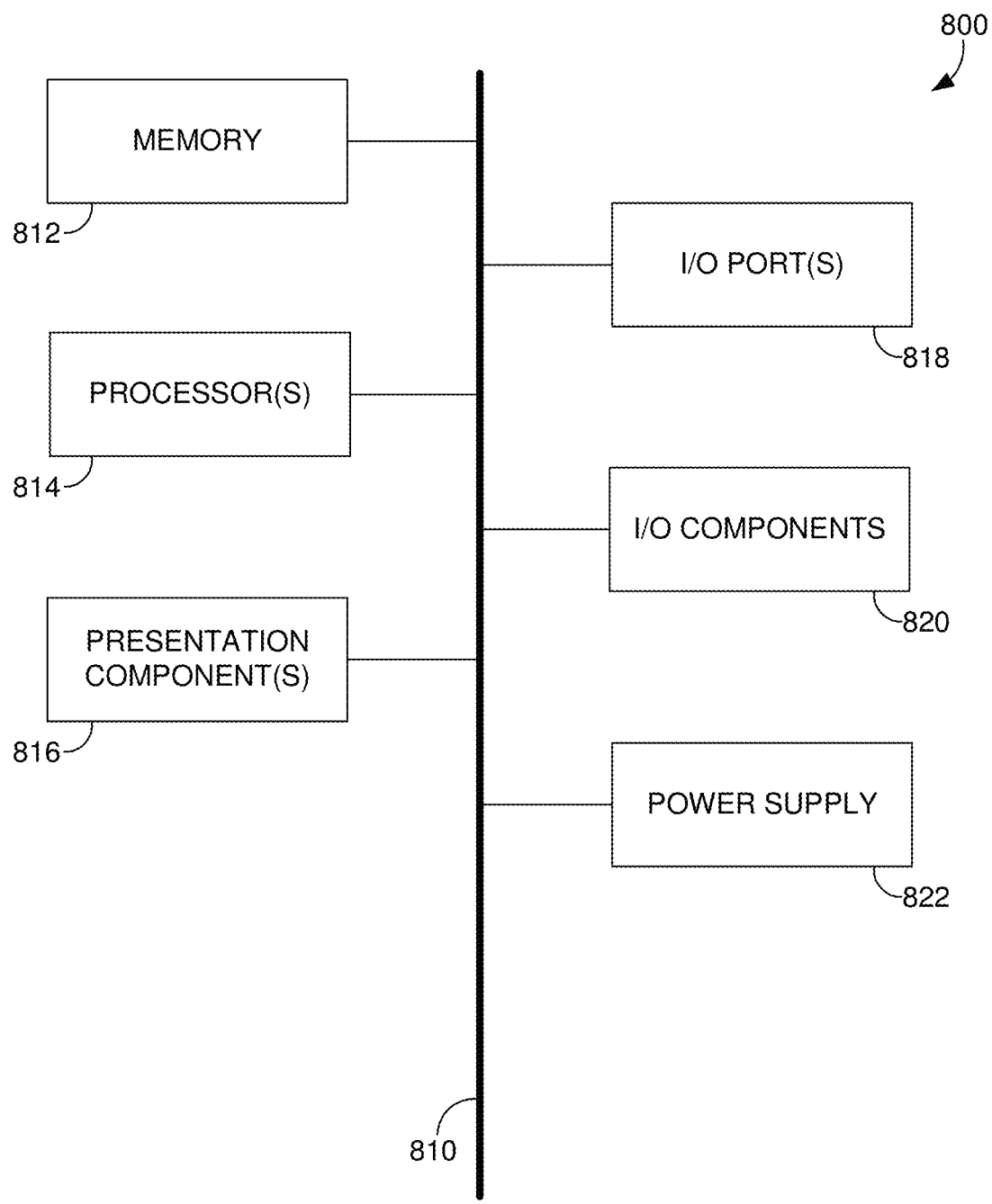
FIG. 8 is a block diagram of an exemplary computing environment suitable for use in implementing aspects of the technology described herein.

Having briefly described an overview of embodiments of the present invention, an example operating environment in which embodiments of the present invention may be implemented is described below in order to provide a general context for various aspects of the present invention. Referring initially to FIG. 8 in particular, an example operating environment for implementing embodiments of the present invention is shown and designated generally as computing device 800. Computing device 800 is but one example of a suitable computing environment and is not intended to suggest any limitation as to the scope of use or functionality of the invention. Neither should computing device 800 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 8, computing device 800 includes bus 810 that directly or indirectly couples the following devices: memory 812, one or more processors 814, one or more presentation components 816, input/output ports 818, input/output components 820, and illustrative power supply 822. Bus 810 represents what may be one or more buses (such as an address bus, data bus, or combination thereof). The various blocks of FIG. 8 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 8 is merely illustrative of an example computing device that can be used in connection with one or more embodiments of the present invention. Distinction is not made between such categories as "workstation," "server," "laptop," "hand-held device," etc., as all are contemplated within the scope of FIG. 8 and reference to "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 800. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes computer storage media in the form of volatile and/or nonvolatile memory. The memory may be removable, non-removable, or a combination thereof. Exemplary hardware devices include solid-state memory, hard drives, optical-disc drives, etc. Computing device 800 includes one or more processors that read data from various entities such as memory 812 or I/O components 820. Presentation component(s) 816 present data indications to a user or other device. Exemplary presentation components include a display device, speaker, printing component, vibrating component, etc.

I/O ports 818 allow computing device 800 to be logically coupled to other devices including I/O components 820, some of which may be built in. Illustrative components include a microphone, joystick, game pad, satellite dish, scanner, printer, wireless device, etc.

Additional Structural and Functional Features of Embodiments of the Technical Solution Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the technical solution environment and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A computerized system comprising:
   one or more computer processors; and
   computer memory storing computer-useable instructions that, when used by the one or more computer processors, cause the one or more computer processors to perform operations, the operations comprising:
   accessing a subtitle file comprising subtitle file data, wherein the subtitle file is associated with video data;
   using the subtitle file data, identifying a subtitle segment associated with the subtitle file data comprising a subtitle segment timestamp including a subtitle start time and subtitle end time;
   based on the subtitle file data and subtitle segment timestamp, identifying a frame from video data, the frame is associated with a subtitle having a subtitle color;
   computing an average background color based on executing a color averaging operation for at least a subtitle display portion of the frame;
   computing a contrast color associated with the average background color; and
   automatically updating the subtitle color in the subtitle file to the contrast color.

2. The system of claim 1, wherein the frame is determined based on the subtitle file data, the subtitle file data is structured textual information that is used to display subtitles during video playback.

3. The system of claim 1, wherein video data comprises pre-recorded video data or streamed video data associated with the subtitle file, wherein the subtitle file enables integrating adaptive subtitle color data with the pre-recorded video data or the streamed video data.

4. The system of claim 1, wherein the color averaging operation computes the average background color as an average pixel brightness of the subtitle display portion of the frame.

5. The system of claim 1, wherein the contrast color is determined based on the average background color that indicates an average pixel intensity, wherein the contrast color is set to white when the average pixel intensity is below a predefined threshold and the contrast color is set to black when the average pixel intensity is above a predefined threshold.

6. The system of claim 1, the operations further comprising:
using the subtitle file data, determining a second frame from the video data, the second frame is associated with a second subtitle having a second subtitle color; and
automatically updating the second subtitle color based on a second contrast color associated with an averaged background color of a subtitle display portion of the second frame.

7. The system of claim 1, wherein adaptive subtitle color management functionality is selectively enabled based on a user selection, wherein updating the subtitle color is a function of an adaptive subtitle color management engine that operates with a video player associated with the video data, the video players is associated with user preferences for adaptive subtitle color management.

8. The system of claim 1, wherein the adaptive color management engine is integrated into an item listing platform video listing interface, wherein user interaction data associated with adaptive subtitles is tracked and used to refine adaptive subtitle color management strategies.

9. The system of claim 1, wherein the adaptive color management engine is integrated into an item listing platform video listing interface, wherein server-side scripts analyze videos to suggest optimal adaptive subtitle colors based on the video.

10. One or more computer-storage media having computer-executable instructions embodied thereon that, when executed by a computing system having a processor and memory, cause the processor to perform operations, the operations comprising:
accessing a subtitle file comprising subtitle file data, wherein the subtitle file is associated with video data;
using the subtitle file data, identifying a subtitle segment associated with subtitle file data comprising a subtitle segment timestamp including a subtitle start time and subtitle end time;
based on the subtitle file data and subtitle segment timestamp, identifying a frame from video data, the frame is associated with a subtitle having a subtitle color;
computing an average background color based on executing a color averaging operation for at least a subtitle display portion of the frame;
computing a contrast color associated with the average background color;
determining that the subtitle file does not support formatting subtitle colors;
generating an updated subtitle file that supports formatting subtitle colors; and
updating the subtitle color to the contrast color in the updated subtitle file.

11. The media of claim 10, wherein the subtitle file data does not provide support for formatting subtitle colors.

12. The media of claim 10, wherein the color averaging operation computes the average background color as an average pixel brightness of the subtitle display portion of the frame.

13. The media of claim 10, wherein the contrast color is determined based on the average background color that indicates an average pixel intensity, wherein the contrast color is set to white when the average pixel intensity is below a predefined threshold and the contrast color is set to black when the average pixel intensity is above a predefined threshold.

14. The media of claim 10, the operations further comprising:
using the subtitle file data, determining a second frame from the video data, the second frame is associated with a second subtitle having a second subtitle color; and
automatically updating the second subtitle color based on the updated subtitle file, a second contrast color associated with an averaged background color of a subtitle display portion of the second frame.

15. The media of claim 10, wherein adaptive subtitle color management functionality is selectively enable based on a user selection.

16. The media of claim 10, wherein updating the subtitle color is a function of an adaptive subtitle color management engine that operates with video player associated with the video data.

17. The media of claim 16, wherein the adaptive color management engine is integrated into an item listing platform video listing interface.

18. A computer-implemented method, the method comprising:
accessing a subtitle file comprising subtitle file data, wherein the subtitle file is associated with video data;
using the subtitle file data, identifying a subtitle segment associated with subtitle file data comprising a subtitle segment timestamp including a subtitle start time and subtitle end time;
based on the subtitle file data and subtitle segment timestamp, identifying a frame from video data, the frame is associated with a subtitle having a subtitle color;
computing an average background color based on executing a color averaging operation for at least a subtitle display portion of the frame;
computing a contrast color associated with the average background color; and
automatically updating the subtitle color to the contrast color.

19. The method of claim 15, wherein the color averaging operation computes the average background color as an average pixel brightness of the subtitle display portion of the frame.

20. The method of claim 15, wherein the contrast color is determined based on the average background color that indicates an average pixel intensity, wherein the contrast color is set to white when the average pixel intensity is below a predefined threshold and the contrast color is set to black when the average pixel intensity is above a predefined threshold.

* * * * *